US010860648B1

(12) United States Patent
McCormick et al.

(10) Patent No.: US 10,860,648 B1
(45) Date of Patent: Dec. 8, 2020

(54) AUDIO LOCALE MISMATCH DETECTION

(71) Applicant: Amazon Technologies, Inc., Seattle, WA (US)

(72) Inventors: Manolya McCormick, Culver City, CA (US); Vimal Bhat, Redmond, WA (US); Shai Ben Nun, Marina Del Ray, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/129,567

(22) Filed: Sep. 12, 2018

(51) Int. Cl.
  *G10L 15/02* (2006.01)
  *G10L 21/10* (2013.01)
  *G06F 17/27* (2006.01)
  *G06F 16/683* (2019.01)
  *G10L 15/00* (2013.01)
  *G10L 15/18* (2013.01)
  *G10L 15/05* (2013.01)
  G10L 15/08 (2006.01)

(52) U.S. Cl.
  CPC .......... *G06F 16/685* (2019.01); *G10L 15/005* (2013.01); *G10L 15/05* (2013.01); *G10L 15/18* (2013.01); G10L 2015/088 (2013.01)

(58) Field of Classification Search
  None
  See application file for complete search history.

(56) References Cited

U.S. PATENT DOCUMENTS

| 6,756,997 | B1 * | 6/2004 | Ward, III | G06Q 30/0269 348/E5.104 |
|---|---|---|---|---|
| 8,554,558 | B2 * | 10/2013 | McCarley | G06F 40/44 704/235 |
| 8,645,137 | B2 * | 2/2014 | Bellegarda | G10L 15/07 704/250 |
| 8,996,369 | B2 * | 3/2015 | Stanford | G06F 16/9577 704/235 |
| 9,093,062 | B2 * | 7/2015 | Daye | H04R 27/00 |
| 9,332,244 | B2 * | 5/2016 | Tsuyuki | H04N 13/254 |
| 9,645,995 | B2 * | 5/2017 | Galle | G06Q 50/01 |
| 9,674,328 | B2 * | 6/2017 | Juneja | G10L 15/22 |
| 2009/0326945 | A1 * | 12/2009 | Tian | |
| 2010/0211376 | A1 * | 8/2010 | Chen | G10L 15/187 704/2 |
| 2010/0223056 | A1 * | 9/2010 | Kadirkamanathan | G10L 15/02 704/235 |

(Continued)

*Primary Examiner* — Seong-Ah A Shin
(74) *Attorney, Agent, or Firm* — Eversheds Sutherland (US) LLP

(57) ABSTRACT

Systems, methods, and computer-readable media are disclosed for detecting a mismatch between the spoken language in an audio file and the audio language that is tagged as the spoken language in the audio file metadata. Example methods may include receiving a media file including spoken language metadata. Certain methods include generating an audio sample from the media file. Certain methods include generating a text translation of the audio sample based on the spoken language metadata. Certain methods include determining that the spoken language metadata does not match a spoken language in the audio sample based on the text translation. Certain methods include sending an indication that the spoken language metadata does not match the spoken language.

20 Claims, 7 Drawing Sheets

(56) References Cited

U.S. PATENT DOCUMENTS

| | | | |
|---|---|---|---|
| 2012/0072204 A1* | 3/2012 | Nasri | G06F 40/253 704/9 |
| 2013/0238336 A1* | 9/2013 | Sung | G10L 15/005 704/255 |
| 2015/0154183 A1* | 6/2015 | Kristjansson | G10L 13/00 704/3 |
| 2015/0255069 A1* | 9/2015 | Adams | G06F 40/263 704/236 |
| 2015/0302006 A1* | 10/2015 | Sasidharan | G06F 16/43 707/741 |
| 2015/0364129 A1* | 12/2015 | Gonzalez-Dominguez | G10L 15/005 704/251 |
| 2017/0025116 A1* | 1/2017 | Mehra | G10L 15/005 |
| 2017/0300976 A1* | 10/2017 | Dogruoz | G06Q 30/0241 |
| 2017/0309276 A1* | 10/2017 | Yeracaris | G10L 25/39 |
| 2018/0109821 A1* | 4/2018 | Gordon | H04N 21/44008 |
| 2018/0308487 A1* | 10/2018 | Goel | G10L 15/22 |
| 2019/0102481 A1* | 4/2019 | Sreedhara | G10L 15/187 |
| 2019/0130931 A1* | 5/2019 | Costa | G08B 27/001 |
| 2020/0042601 A1* | 2/2020 | Doggett | H04N 21/8106 |

* cited by examiner

AUDIO LOCALE MISMATCH DETECTION

BACKGROUND

The digital multimedia revolution has greatly increased the quantity, availability and distribution of media content. The delivery of media over networks such as the Internet can be accomplished in many ways, including through on-demand video distribution (sometimes referred to as video on demand (VOD) or on demand viewing) and media streaming (sometimes referred to as live streaming, pseudo-live streaming, or streaming). The exponential proliferation of digital media present many significant challenges to the multimedia industry.

As the number of unique pieces of digital media content available to consumers continues to grow, there is much effort in industry and academia to provide or improve upon technologies that can accurately characterize and classify the media content without human intervention. In recent years, in order to facilitate access to media content, especially streaming media data (e.g., TV programs, movies supplied by DVDs, etc.), there has been an attempt to add metadata to media content using various coding formats.

In the present context, metadata ("data about data") may be information associated with media content that describes the context, quality, condition, or other characteristic of the media content. For instance, metadata can be used to describe or otherwise identify the spoken language (e.g., the audio locale) associated with a particular media content. Metadata can be used to search through a large number of media content for a particular characteristic, such as a movie file encoded in the English language. In this manner, accurate metadata characterizations are critical for maintaining an enjoyable customer experience.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

The popularization of both on-demand viewing and media streaming as methods for media distribution has grown exponentially. This increased popularization has created new problems for media content producers and distributors. One such problem is the difficulty in successfully tagging or otherwise associating the media content with accurate metadata. Metadata may be used to describe the context, quality, condition, audio language, length, or other characteristic of the media content. For example, metadata can be used to describe or otherwise identify the spoken language (e.g., the audio locale) associated with a particular media content. Accurate metadata greatly improves the consumer experience, as metadata can be used to efficiently filter through a large number of media content for a desired characteristic. For example, a consumer can search for a version of a movie encoded in the English language.

As the volume of media content available to consumers continues to exponentially grow, even small errors associated with a metadata tagging system can result in a large number of mischaracterized media files. The erroneous tagging of an audio locale (e.g., spoken language metadata) in a media asset causes an inconsistent and frustrating viewing experience. Moreover, metadata mismatches can result in customer complaints and reduced customer retention rates. Accurate metadata tagging is especially significant for high profile media titles, which may be viewed by a large number of consumers.

Embodiments of the disclosure include devices, systems, methods, computer-readable media, techniques, and methodologies for detecting an audio locale mismatch in the metadata of media content. Certain embodiments provide new techniques for detecting when the spoken language in an audio file does not match the language tagged (e.g., indicated) in the file's metadata. Although described primarily in the context of an audio file and audio file metadata, aspects of the invention may be applied to various other forms of digital media, including any media content having audio data and spoken language metadata.

Figure 1:
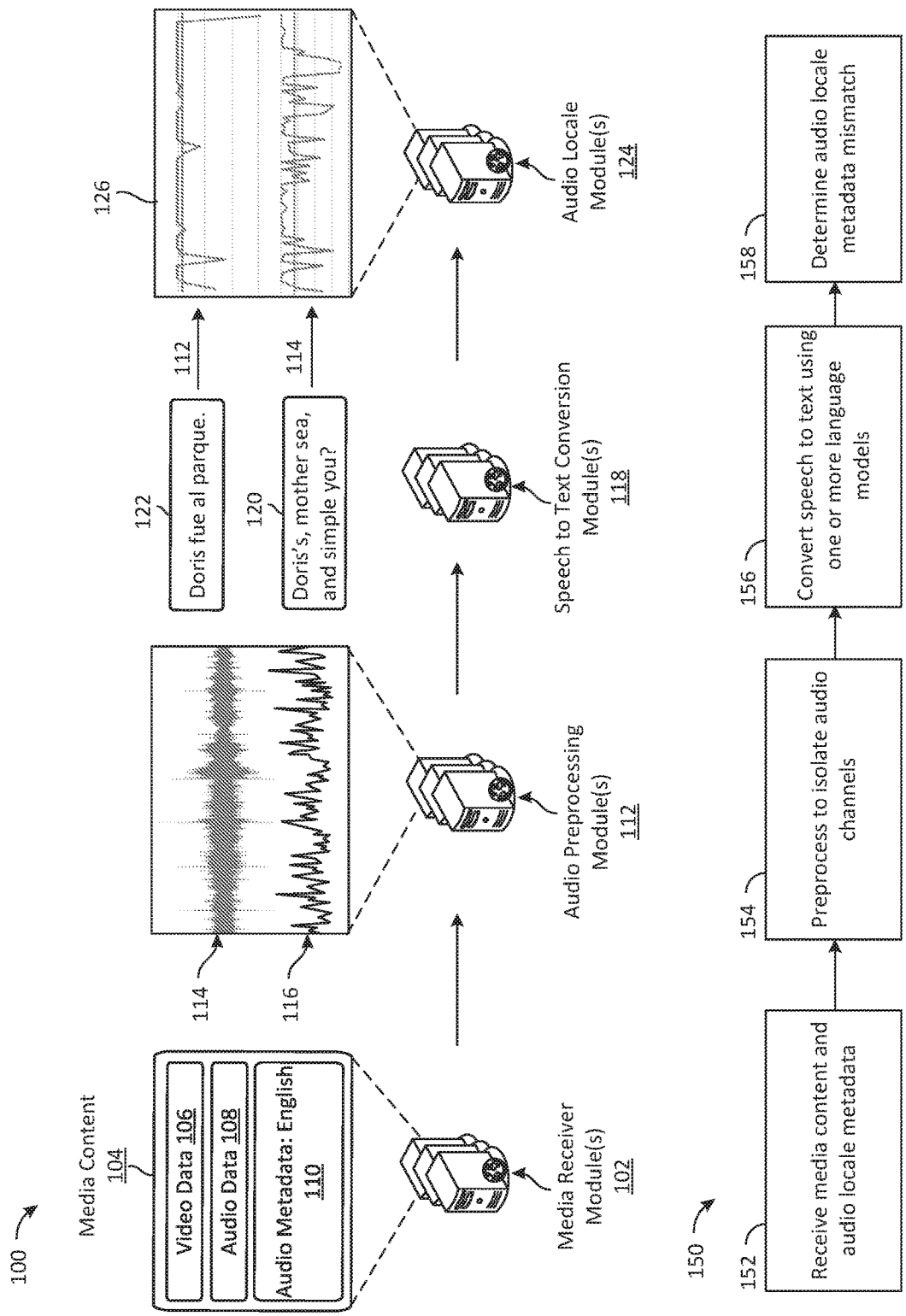
FIG. 1 is a hybrid system and process diagram illustrating the detection of an audio locale mismatch in accordance with one or more example embodiments of the disclosure.

Referring to FIG. 1, an example use case 100 for detecting an audio locale mismatch is depicted in accordance with one or more example embodiments of the disclosure. As illustrated in FIG. 1, a media receiver module 102 may receive media content 104 for processing. The media receiver module 102 may include any suitable computing device capable of receiving and/or generating data including, but not limited to, a remote server or servers; a desktop computer; a laptop computer; a workstation, a cloud-based computing environment, resource, platform, or service, a distributed system, or the like. The media content 104 may include any suitable media content having audio metadata, such as, for example, a video file having video data 106, audio data 108, and audio metadata 110 (also referred to as audio locale or spoken language metadata). As depicted in FIG. 1, the audio metadata 110 indicates that the spoken language for the media content 104 is "English."

The media content 104 may be provided to the media receiver module 102 by any suitable upstream system, such as, for example, a local or remote database utilized or otherwise accessed by a content manager, media producer, or a media distribution service or system. In some embodiments, the media receiver module 102 is a local or remote database. In some embodiments, the media receiver module 102 is a database accessible by an audio preprocessing module 112.

In some embodiments, the audio preprocessing module 112 may receive the media content 104 from the media receiver module 102 over one or more communication networks. The audio preprocessing module 112 may include any suitable computing device capable of receiving and/or generating data including, but not limited to, a remote server or servers; a desktop computer; a laptop computer; a workstation, a cloud-based computing environment, resource, platform, or service, a distributed system, or the like. In some embodiments, the audio preprocessing module 112 may generate one or more audio samples from the media content 104. For example, a 10, 20, or 30-second audio sample can be generated for a two-hour long movie, although other sample durations are within the contemplated scope of the disclosure. In this manner, downstream language analysis may not be burdened with the entirety of the media content 104.

In some embodiments, the audio preprocessing module 112 selects a portion of the media content 104 for generating the audio sample based on subtitle data associated with the media content 104. For example, subtitle data may be analyzed to locate portions of the media content 104 where dialog will most likely occur (e.g., based on the amount and density of words in the subtitle file) and/or portions of the dialog having a high variety of spoken words (e.g., based on the variety of words in the subtitle file). In some embodiments, the audio preprocessing module 112 selects a portion of the media content 104 for generating the audio sample randomly, or according to one or more rules (e.g., the first 20 seconds, the last minute, etc.). Once suitable portions of the media content 104 having a large amount of dialog are identified, the audio preprocessing module 112 may generate an audio sample covering these dialog-rich portions.

In some embodiments, the audio preprocessing module 112 may filter the media content 104 or media sample to provide one or more isolated audio channels 114. Because raw, noisy audio samples and audio samples with no discernable dialog are poor candidates for language analysis, secondary audio 116 (e.g., background noise, music, and any other audio interference) may be removed from the isolated audio channels 114. In this manner, a clean audio sample with audible dialog may be provided. In some embodiments, such as when the media content 104 includes multi-track audio, the audio preprocessing module 112 may isolate one or more audio tracks having dialog from one or more tracks having other audio, such as music. The media content 104 or audio sample may be preprocessed to isolate one or more audio samples having audible dialog using, for example, sound filtering and audio track extraction libraries. In some embodiments, the audio preprocessing module 112 isolates one or more audio samples having audible dialog using an audio/video conversion tool or codec (e.g., FFmpeg).

In some embodiments, a speech to text conversion module 118 may receive the isolated audio channels 114 from the audio preprocessing module 112. The speech to text conversion module 118 may generate one or more text translations for the audio sample based on one or more respective languages. The speech to text conversion module 118 may include any suitable computing device capable of receiving and/or generating data including, but not limited to, a remote server or servers; a desktop computer; a laptop computer; a workstation, a cloud-based computing environment, resource, platform, or service, a distributed system, or the like.

There are various automatic speech recognition (ASR) engines that translate spoken words into text. ASR technology may depend on translating words based on a provided language. In other words, an ASR model may utilize both an audio sample and the known audio language associated with the audio sample to create an accurate text translation. For example, an accurate text translation of an English audio file may utilize as input both a sample of the audio file and a designation that the audio file is in English.

In some embodiments, the speech to text conversion module 118 may generate one or more text translations for the audio sample without knowing the true spoken language associated with the audio sample. In some embodiments, the speech to text conversion module 118 may generate a first text translation 120 for the audio sample based on the audio language identified in the audio metadata 110. In some embodiments, the speech to text conversion module 118 may generate one or more additional text translations for the audio sample based on one or more additional languages. As depicted in FIG. 1, a Spanish-based second text translation 122 may be generated for the audio sample.

In some embodiments, an audio locale module 124 may receive the text translations (e.g., the first text translation 120 and the second text translation 122) from the speech to text conversion module 118. The audio locale module 124 may include any suitable computing device capable of receiving and/or generating data including, but not limited to, a remote server or servers; a desktop computer; a laptop computer; a workstation, a cloud-based computing environment, resource, platform, or service, a distributed system, or the like.

In some embodiments, the audio locale module 124 determines whether the language identified in the audio metadata 110 matches the actual spoken language in the audio sample. In some embodiments, the audio locale module 124 may leverage the fact that generating a text translation of an audio sample using the wrong input language (e.g., the assumed language identified in the metadata) will result in a measurably incorrect translation. Consequently, the text translation may be used to prove that the spoken language is not the same as the model language.

As an example, English and Spanish translations can be generated for a Spanish audio sample having an English audio metadata tag. The original audio sample translated using a Spanish ASR model may be as follows: "Pat fue al parque con su padre para ver los patos en el agua" (in English, "Pat went to the park with his parent to watch the ducks on the water.").

That same Spanish audio sample, when translated using the English model may be, for example, "Pat go afraid team in, mother sea. And you? The a simple thing aquifer."

As observed from this example, the translation consists of English words but is syntactically incorrect and contains no semantic meaning. This is due in part to the fact that the model assumed that the Spanish audio was actually English. In other words, the model looked for the closest English words to the Spanish dialog. In some embodiments, the audio locale module 124 may determine whether a language identified in the audio metadata matches the actual spoken language in an audio sample based on a syntactic and/or semantic analysis of the translation. Advantageously, a strictly accurate text translation of the audio sample is not required to analyze the audio metadata in this manner.

In some embodiments, the speech to text conversion module 118 may not attempt to create a strictly accurate text translation of the audio sample (e.g., a translation having a translation confidence greater than 95, 98, or 99 percent). Instead, the speech to text conversion module 118 may generate a rough translation (e.g., a conversion having a translation confidence greater than 50, 60, 75, or 90 percent) which is sufficient to identify syntactic or semantic deficiencies.

In some embodiments, the audio locale module 124 may calculate a confidence score for each word in the text translation. This confidence score denotes the relative confidence the model had in the translated word. For example, the word "Pat" in the English translation example above may have a relatively high confidence score of 0.93 (out of 1 or 100% confidence), while the word "afraid" may have a relatively low confidence score of 0.36.

In some embodiments, the audio locale module 124 may leverage the per word confidence scores to determine whether the actual spoken language in an audio sample is the same as the spoken language identified in the audio sample metadata. In some embodiments, the audio locale module 124 performs one or more statistical analysis of the per word confidence scores to generate one or more statistical metrics 126. In some embodiments, an average translation confidence score is calculated based on the per word confidence scores. In some embodiments, a standard deviation may be calculated for the confidence scores. In some embodiments, a mean squared error may be calculated for the confidence scores.

In some embodiments, the statistical metric 126 (e.g., an average confidence, a standard deviation, or a mean squared error of the translation) may be compared against a threshold to determine whether the actual spoken language in an audio sample is the same as the spoken language identified in the audio sample metadata. For example, a translation having a high average confidence (e.g., an average confidence above 0.90, 0.95, or an average confidence higher than that provided by one or more other language models) is more likely to be based on the correct, or true spoken language in an audio file. Similarly, a translation having a low standard deviation (e.g., a standard deviation of less than 0.30, 0.40, or a standard deviation less than that provided by one or more other language models), or a low mean squared error (e.g., a mean squared error of less than 0.20, 0.10, or a mean squared error less than that provided by one or more other language models), is more likely to be based on the correct spoken language.

In some embodiments, the statistical metric 126 may be compared against multiple thresholds. In some embodiments, a first threshold (an upper threshold) may be set that corresponds to a sufficiently high enough confidence to indicate a match between the spoken language in an audio sample and the language metadata without further processing. For example, if the average confidence of a text translation is greater than 0.95, or 0.98, the audio locale module 124 may indicate that the actual spoken language in an audio sample is the same as the spoken language identified in the audio sample metadata.

In some embodiments, a second threshold (for example, a lower threshold) may be set that corresponds to a sufficiently low enough confidence to indicate a mismatch between the spoken language in an audio sample and the language metadata without further processing. For example, if the average confidence of a text translation is less than 0.75, or 0.50, the audio locale module 124 may indicate that the actual spoken language in an audio sample is not the same as the spoken language identified in the audio sample metadata.

In some embodiments, the statistical metric 126 may fall between the first threshold and the second threshold. In some embodiments, the audio locale module 124 may indicate that additional processing may be needed to determine whether the actual spoken language in an audio sample is the same as the spoken language identified in the audio sample metadata. While specific thresholds are indicated for illustrative purposes, it is understood that the first threshold and the second threshold may be set higher or lower to tune the aggressiveness of the audio locale module 124. For example, the first threshold can be arbitrarily increased to force more text translations to undergo additional processing. Conversely, the first threshold can be arbitrarily lowered to reduce the number of text translations that require additional processing.

In some embodiments, the aggressiveness of the audio locale module 124 may be based on the exposure or anticipated exposure of a media sample to consumers. For example, a blockbuster title having millions of views may be subjected to relatively tight thresholds (e.g., a confidence of greater than 0.99 may be required to avoid additional processing) while thresholds for an independent film having only hundreds of views may be somewhat relaxed.

In some embodiments, the audio locale module 124 may require additional processing to determine whether the actual spoken language in an audio sample is the same as the spoken language identified in the audio sample metadata. In some embodiments, the audio locale module 124 may compute and then compare an actual n-gram frequency of the text translation against an expected n-gram frequency based on the assumed language of the text translation.

An n-gram is a contiguous sequence of n items (e.g., words) from a given sample of text or speech. For example, the phrase "to be or not to be" includes the 2-grams "to be," "be or," "or not," "not to," and "to be." Similarly, the phrase "to be or not to be" includes the 3-grams "to be or," "be or not," "or not to," and "not to be." An n-gram frequency for a given n-gram denotes the likelihood or probability that the sequence defined by the n-gram will occur in the respective language. For example, the 2-gram "the dog" may have an expected frequency of 0.0001 percent in the English language, while the 2-gram "dog the" may have an expected frequency of 0.00001 percent (e.g., a full order of magnitude less likely to occur than "the dog").

In some embodiments, the audio locale module 124 may compare one or more n-grams (e.g., 2-grams) in a text translation against an expected n-gram frequency. In some embodiments, the expected n-gram frequencies may be based on n-gram frequencies stored in an n-gram database. In some embodiments, the n-gram database may contain a list of possible n-grams for a given language and their expected frequencies. In some embodiments, the expected frequencies may be computed using one or more source materials (e.g., dictionaries, literature, or other language sources) over a predetermined period of time. For example, the expected frequencies may be based on a collection of English books published after 1950. The n-gram database can be easily extendible by adding additional text sources. In some embodiments, the n-gram database may be built from books written in English (British and American), Chinese (simplified), French, German, Hebrew, Italian, Russian and Spanish, although other languages are within the contemplated scope of the disclosure.

In some embodiments, the audio locale module 124 may use n-gram frequencies as an additional indication for determining whether the actual spoken language in an audio sample is the same as the spoken language identified in the audio sample metadata. In some embodiments, the audio locale module 124 may compute one or more 2-grams for a given text translation, although other n-grams are within the contemplated scope of the disclosure. In some embodiments, 2-grams (also referred to as bi-grams) may provide higher accuracy than tri-grams and larger n-grams. For a given text sample, the set of possible larger n-grams will be smaller than the set of bigrams, which may make it more difficult to statistically validate a text translation for correct n-gram sequences, especially for small sample sizes. This may result in false positives for sufficiently small samples.

In some embodiments, the audio locale module 124 may compare one or more n-gram frequencies in the text translation against the expected n-gram frequencies in the n-gram database. In some embodiments, the audio locale module 124 may determine, based on the comparison, whether one or more of the actual n-gram frequencies statistically deviates from the expected n-gram frequencies. For example, if a particular 2-gram appears in 0.0003 percent of the text translation, but the expected frequency is 0.0000001 percent, the audio locale module 124 may indicate that the actual spoken language in an audio sample is not the same as the spoken language identified in the audio sample metadata. In some embodiments, the audio locale module 124 may determine a low average and/or a minimum bi-gram frequency threshold as an indication of a mismatch between the audio language and the preconceived audio locale.

In some embodiments, the audio locale module 124 may determine a number of n-gram frequencies in the text translation that differ from the expected n-gram frequency by more than a threshold (also referred to as outlier n-grams). For example, the audio locale module 124 may determine that 11 2-grams appear in the text translation at a frequency that differs from their respective expected frequency by more than an order of magnitude, although other thresholds are within the contemplated scope of the disclosure. In some embodiments, the audio locale module 124 compares the number of outlier n-grams to a predetermined threshold. For example, the audio locale module 124 may indicate a mismatch if 10%, 20%, 50%, 70%, of the n-gram frequencies differ from their expected frequencies.

In some embodiments, the size of the audio sample for generating the text translation may not be sufficiently large and the audio locale module 124 is unable to confidently determine whether the actual spoken language in an audio sample is the same as the spoken language identified in the audio sample metadata. In some embodiments, the audio locale module 124 may increase the size of the initial audio sample used to generate the text translation. For example, the audio locale module 124 may analyze an audio sample having a first duration (e.g., 20 seconds) according to one or more embodiments. If a consensus cannot be reached, the audio locale module 124 may increase the duration of the audio sample. In some embodiments, the audio locale module 124 may increase the audio sample duration according to one or more rules (e.g., double the duration, add 30 seconds to the duration, etc.).

For example, the audio locale module 124 may determine an initial audio sample having a duration of 1 minute. The audio locale module 124 may then generate and analyze a text translation of the audio sample according to one or more embodiments (e.g., determining a statistical metric confidence score, 2-gram frequencies, etc.). If a consensus can be reached, the audio locale module 124 may indicate whether the actual spoken language in an audio sample is the same as the spoken language identified in the audio sample metadata. If a consensus cannot be reached using the audio sample, the audio locale module 124 may increase the audio sample duration to 2 minutes, 5 minutes, or to any other duration up to and including the full duration of the media content.

In some embodiments, the media content 104 may include a timed text asset. For example, the media content 104 may include one or more subtitle tracks with timestamps. In some embodiments, the audio locale module 124 may compare a text translation against the timed text asset to determine whether the actual spoken language in an audio sample is the same as the spoken language identified in the audio sample metadata. Because the timed text asset itself may be tagged with an incorrect language, the audio locale module 124 may, in some embodiments, detect the actual language of the timed text. Detecting the actual language in a text sample is easier than doing so for an audio sample, and can be accomplished using known processes.

In some embodiments, if a timed text asset is present with the same audio locale as the audio sample, the audio locale module 124 may compare the respective text translation against the timed text to validate whether the text translation and timed text are the same language. For example, the timed text may indicate that the phrase "to be or not to be" will occur at a particular timestamp in the audio sample (e.g., at 30 minutes and 11 seconds). The audio locale module 124 may generate a text translation of the audio sample corresponding to 30 minutes and 11 seconds into the media content 104. The audio locale module 124 may then compare the respective text translation against the timed text.

In some embodiments, the audio locale module 124 may look for one or more matching strings of characters or words in the timed text and text translation. In some embodiments, the timed text might be out of sync with the audio sample, which might result in an erroneous evaluation of the text translation. For example, the audio locale module 124 may indicate that the text translation does not match the timed text when in fact the languages are the same, because the audio locale module 124 is attempting to compare different portions of the media content 104 dialog. In some embodiments, the media content 104 may add an extended time frame around the audio sample search to look for matches to the timed text further away from the exact timestamp of the audio. In other words, if the phrase "to be or not to be" is expected at 40 minutes based on the timed text, the media content 104 may search a window of 35 to 45 minutes of the audio sample for the matching phrase. While a particular window (e.g., within 5 minutes) is provided for illustration, it is understood that the duration of the window can be arbitrarily increased or decreased, and other window durations are within the contemplated scope of the disclosure.

In some embodiments, the audio locale module 124 may parse the transcribed text and validate it for correct spelling, grammar, or syntax as an additional indication for determining whether the actual spoken language in an audio sample is the same as the spoken language identified in the audio sample metadata. In some embodiments, the spelling and grammar within the text translation may be validated using known processes (e.g., using available grammar or spelling libraries). In some embodiments, the audio locale module 124 determines a syntactic analysis of the text translation. In some embodiments, the syntactic analysis includes natural language processing.

A natural language is any language that has evolved naturally in humans through use and repetition without conscious planning or premeditation. Natural language processing focuses on programming computers to analyze and extract meaning from natural language. Some examples are syntax analysis such as part-of-speech (PoS) tagging and semantic analysis such as sentiment analysis and machine translation. In some embodiments, the audio locale module 124 may validate the text translation using part-of-speech (PoS) tagging and/or sentiment analysis. Part-of-speech (PoS) tagging and/or sentiment analysis may be accomplished using known processes.

In some embodiments, the audio locale module 124 may compute a score based on the spelling, grammar, or syntactic analysis. For example, the audio locale module 124 may count a number of grammatically incorrect or incoherent strings within the text translation. In some embodiments, the audio locale module 124 may compare the number of grammatically incorrect or incoherent strings against a threshold to determine whether the actual spoken language in an audio sample is the same as the spoken language identified in the audio sample metadata.

In some embodiments, the audio locale module 124 may determine that the actual spoken language in an audio sample is not the same as the spoken language identified in the audio sample metadata. In some embodiments, the audio locale module 124 may generate and send an alert to a metadata correction module indicating the mismatch. In some embodiments, the audio locale module 124 may replace the audio locale metadata in the media content 104 with a placeholder indicating an unknown audio language. In some embodiments, the audio locale module 124 may replace the audio locale metadata with the correct spoken language.

The correct spoken language may be identified in various ways. In some embodiments, the audio locale module 124 generates one or more additional text translations of the audio sample using one or more additional languages (e.g., one or more languages other than the language identified in the audio locale metadata). The audio locale module 124 may then identify the correct language by determining the text translation that provides the best match to the audio sample according to one or more embodiments (e.g., using translation confidence scores, n-gram frequencies, or spelling, grammar, and syntax accuracy). For example, the audio locale module 124 may initially determine that an audio file tagged as having English language spoken audio includes a metadata mismatch according to one or more embodiments. The audio locale module 124 may then generate text translations of the audio sample in Spanish, Russian, Chinese, German, or any other language. The audio locale module 124 may then identify which language provided a text translation that best matched the audio sample. For example, if the Russian language provided the text translation having the highest translation confidence scores, or the most accurate n-grams, spelling, grammar, or syntax, the audio locale module 124 may replace the audio locale metadata with "Russian."

In some embodiments, the audio locale module 124 may generate one additional text translation at a time, and may check the generated text translation for a match confidence according to one or more embodiments prior to determining whether any additional text translations are required. For example, if the second language is Spanish and a text translation confidence score for the Spanish model exceeds a threshold (e.g., greater than 0.95, 0.98, etc.), the audio locale module 124 may terminate the search for the correct audio locale. In this manner, the audio locale module 124 may efficiently and systematically check only the necessary additional languages.

In some embodiments, the audio locale module 124 may select a next language to check according to one or more rules. For example, the audio locale module 124 may prioritize the most commonly spoken languages globally. In some embodiments, the audio locale module 124 may select a next language based on other metadata of the media content 104. For example, the audio locale module 124 may prioritize the most commonly spoken language associated with the distribution region of the media content 104 (e.g., English may be checked first for a media file distributed in North America).

In some embodiments, the audio locale module 124 may use a brute force method whereby all available language models are applied against the audio sample to identify the language that provides the best text translation. In some embodiments, the audio locale module 124 may reserve a brute force approach to only high profile media content, such as, for example, a high-budget film viewed by millions of customers.

To detect an audio locale mismatch in the metadata of media content, an example process flow 150 is presented and may be performed, for example, by the media receiver module 102, the audio preprocessing module 112, the speech to text conversion module 118, and/or the audio locale module 124. In some embodiments, the media receiver module 102, the audio preprocessing module 112, the speech to text conversion module 118, and/or the audio locale module 124 may each include at least one memory that stores computer-executable instructions and at least one processor configured to access the at least one memory and execute the computer-executable instructions to perform various actions or operations, such as one or more of the operations in the process flow 150 of FIG. 1.

At a first block 152, media content (e.g., the media content 104) having audio locale metadata (e.g., the audio metadata 110) is received by the media receiver module 102 according to one or more embodiments. The media content may be provided to the media receiver module 102 by any suitable upstream system, such as, for example, a local or remote database.

At block 154, the media content is preprocessed by the audio preprocessing module 112 to isolate one or more audio channels according to one or more embodiments. In some embodiments, preprocessing may include generating one or more audio samples from the media content. For example, a 10, 20, or 30-second audio sample can be generated for a two-hour long movie. In some embodiments, preprocessing may include determining an audio sample based on the media content. In some embodiments, subtitle data or other metadata may be analyzed to locate portions of the media content where the most dialog or the most varied dialog will most likely occur. In some embodiments, preprocessing may include filtering the media sample to remove non-dialog audio, such as background noise or music. As described previously herein, the resulting preprocessed media sample may be one or more isolated audio channels.

At block 156, the speech to text conversion module 118 converts the audio sample to text using one or more language models according to one or more embodiments. In some embodiments, the speech to text conversion module 118 may generate a text translation for the audio sample based on the audio language identified in the audio metadata. In some embodiments, the speech to text conversion module 118 may generate a text translation for the audio sample without knowing the actual spoken language associated with the audio sample. In other words, the speech to text conversion module 118 may initially assume that the audio locale metadata is correct.

At block 158, the audio locale module 124 determines whether the language used to generate the text translation matches the audio locale metadata according to one or more embodiments. This process may be referred to as an audio matching step. In some embodiments, audio matching may include determining and comparing one or more statistical metrics (e.g., an average confidence, a standard deviation, or a mean squared error of the translation) against a threshold according to one or more embodiments. In some embodiments, audio matching may include determining an actual n-gram frequency of the text translation and comparing the actual n-gram frequency against an expected n-gram frequency based on the language identified in the audio locale metadata. In some embodiments, audio matching may include comparing one or more strings in the text translation against a timed text asset according to one or more embodiments. In some embodiments, audio matching may include parsing the translated text and validating it for correct spelling, grammar, or syntax according to one or more embodiments.

Example embodiments of the disclosure provide a number of technical features or technical effects. For example, in accordance with example embodiments of the disclosure, certain embodiments of the disclosure may receive a media file having audio locale metadata, preprocess the media file to isolate one or more audio channels, convert the audio channels to text, and analyze the text conversions to identify an audio locale mismatch. In some embodiments, two or more text translations may be generated for two or more respective languages. In this manner, the most confident text translation may be used to indicate a spoken language match.

Embodiments of the disclosure may improve the delivery of media content to consumers by allowing for the dynamic and real-time correction of media content spoken language metadata. In some embodiments, mismatched audio language metadata may be identified without requiring an exhaustively generated accurate text translation because the output text generated from an incorrect language model will be measurably incorrect, even without knowing the actual true text translation. Such a translation scheme improves computing efficiency by reducing the required translation accuracy and the associated compute complexity. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
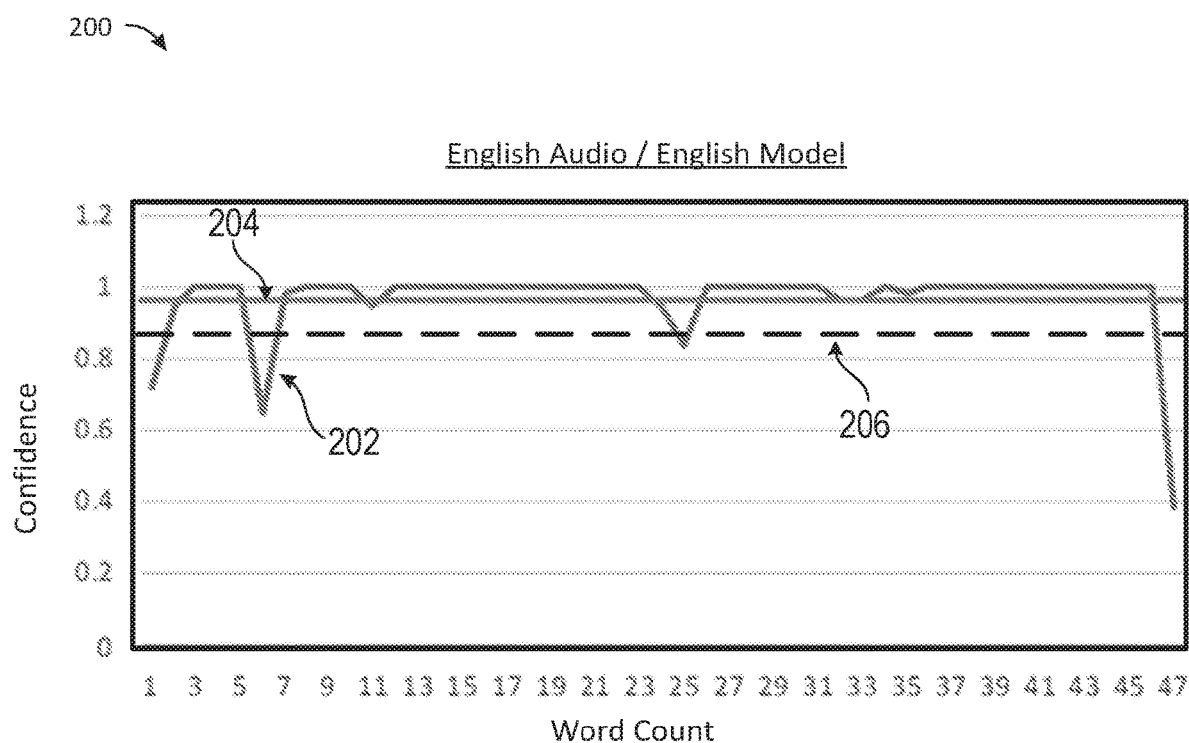
FIG. 2 is a schematic illustration of per word translation confidence scores obtained after applying an English translation model to an English audio sample in accordance with one or more example embodiments of the disclosure.

FIG. 2 schematically illustrates an exemplary graph 200 depicting per word translation confidence scores obtained after applying an English translation model to an English audio sample in accordance with one or more example embodiments of the disclosure. As discussed previously herein, a text translation based on the same language as the underlying audio sample will be more accurate than a text translation based on a language model that does not match the audio sample.

As illustrated in FIG. 2, the graph 200 includes a per word confidence score 202 for an audio sample having 47 words. The per word confidence score 202 for a given word in the audio sample ranges from approximately 0.65 to 1.0. The average confidence score 204 is approximately 0.96, with a standard deviation of approximately 0.10 and a mean squared error of approximately 0.01. An exemplary confidence threshold 206 having an approximate value of 0.90 is also depicted. As illustrated in FIG. 2, the average confidence score 204 is higher than the confidence threshold 206, indicating a match between the actual language in the audio sample and the language used to generate the text translation. In some embodiments, the graph 200 may be leveraged to determine whether the actual spoken language in an audio sample (here, "English") is the same as the spoken language identified in the audio sample metadata. For example, the data in the graph 200 may be used by the audio locale module 124 depicted in FIG. 1.

Figure 3:
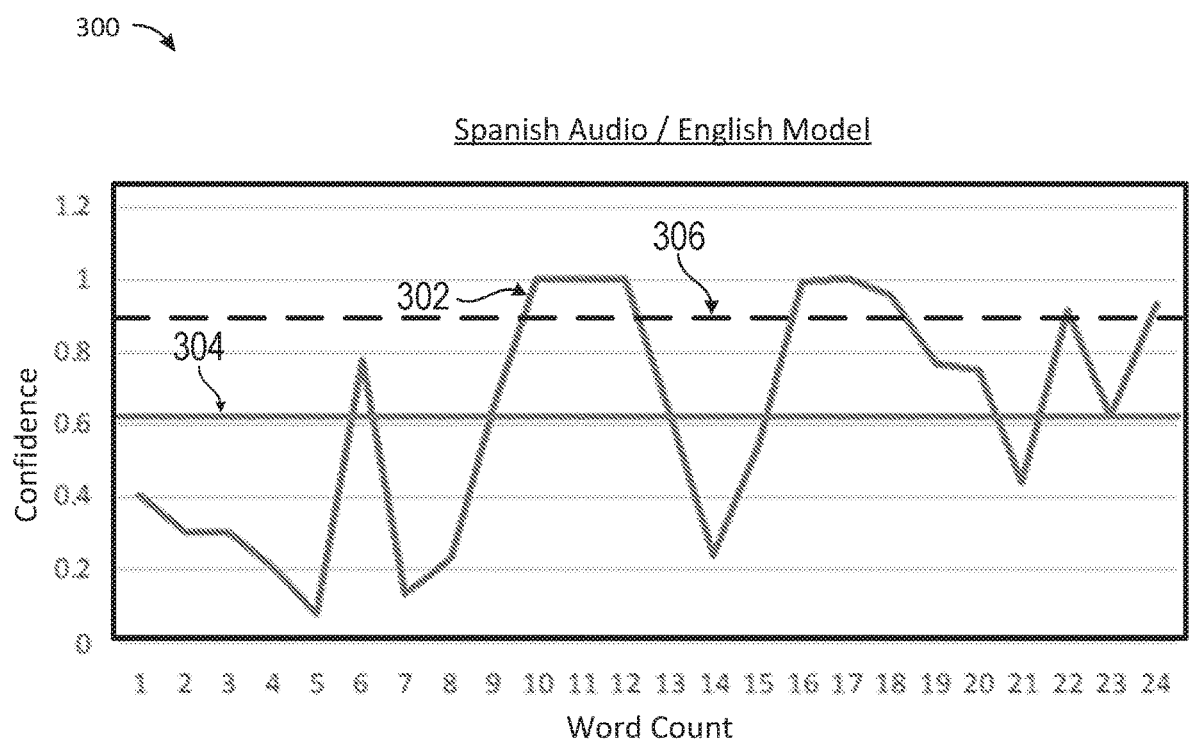
FIG. 3 is a schematic illustration of per word translation confidence scores obtained after applying a Spanish translation model to an English audio sample in accordance with one or more example embodiments of the disclosure.

FIG. 3 schematically illustrates an exemplary graph 300 depicting per word translation confidence scores obtained after applying an English translation model to a Spanish audio sample in accordance with one or more example embodiments of the disclosure. As discussed previously herein, a text translation based on the same language as the underlying audio sample will be more accurate than a text translation based on a language model that does not match the audio sample.

As illustrated in FIG. 3, the graph 300 includes a per word confidence score 302 for an audio sample having 24 words. The per word confidence score 302 for a given word in the audio sample ranges from approximately 0.15 to 1.0. The average confidence score 304 is approximately 0.62, with a standard deviation of approximately 0.31 and a mean squared error of approximately 0.24. An exemplary confidence threshold 306 having an approximate value of 0.90 is also depicted. As illustrated in FIG. 3, the average confidence score 304 is lower than the confidence threshold 306, indicating a mismatch between the actual language in the audio sample and the language used to generate the text translation. In some embodiments, the graph 300 may be leveraged to determine whether the actual spoken language in an audio sample (here, "Spanish") is the same as the spoken language identified in the audio sample metadata. For example, the data in the graph 300 may be used by the audio locale module 124 depicted in FIG. 1.

Figure 4:
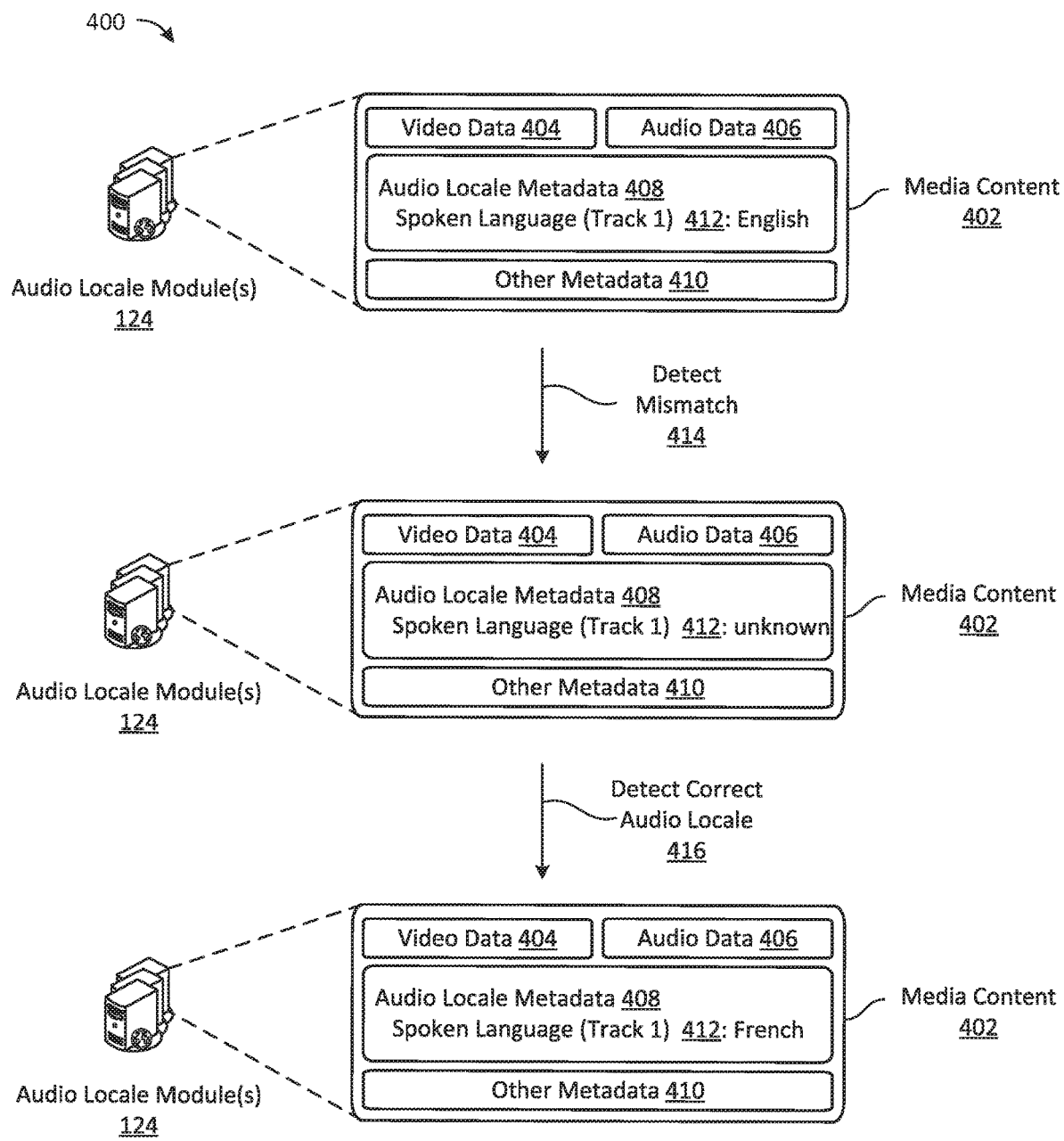
FIG. 4 is a schematic illustration of an example process illustrating the detection and correction of an audio locale mismatch in accordance with one or more example embodiments of the disclosure.

FIG. 4 schematically illustrates an example use case and an exemplary process for detecting and correcting an audio locale mismatch in accordance with one or more example embodiments of the disclosure. As discussed previously herein with respect to FIG. 1, the audio locale module 124 may verify whether the actual spoken language in an audio sample of media content is the same as the spoken language identified in the audio locale metadata. As illustrated in FIG. 4, media content 402 includes video data 404, audio data 406, audio locale metadata 408, and other metadata 410. The other metadata 410 may include, for example, a distribution country or origin of the media content 402, a list of actors and actresses featured in the media content 402, or any other information about the media content 402.

In some embodiments, the audio data 406 may be integrated with the video data 404 as one or more audio tracks or channels. As depicted, the audio locale metadata 408 identifies a spoken language 412 (e.g., "English") for a first audio track of the media content 402.

The audio locale module 124 may detect a mismatch 414 between the spoken language 412 and the actual spoken language in Track 1 of the media content 402. In some embodiments, detecting the mismatch 414 may include generating a text translation based on the media content 402. In some embodiments, detecting the mismatch 414 may include determining and comparing one or more statistical metrics (e.g., an average confidence, a standard deviation, or a mean squared error of the translation) of the text translation against a threshold according to one or more embodiments. In some embodiments, detecting the mismatch 414 may include determining an actual n-gram frequency of the text translation and comparing the actual n-gram frequency against an expected n-gram frequency based on the language identified in the audio locale metadata. In some embodiments, detecting the mismatch 414 may include comparing one or more strings in the text translation against a timed text asset according to one or more embodiments. In some embodiments, detecting the mismatch 414 may include parsing the translated text and validating it for correct spelling, grammar, or syntax according to one or more embodiments.

As illustrated in FIG. 4, the audio locale module 124 may update the media content 402 to indicate that the spoken language 412 is unknown. In some embodiments, the audio locale module 124 will identify the actual spoken language in the media content 402. As discussed previously herein, the correct spoken language may be identified in various ways. In some embodiments, the audio locale module 124 generates one or more additional text translations of the media content 402 using one or more additional languages (e.g., one or more languages other than the spoken language 412 identified in the audio locale metadata 408). The audio locale module 124 may then identify the correct language by determining the text translation that provides the best match to the audio sample according to one or more embodiments (e.g., using translation confidence scores, n-gram frequencies, or spelling, grammar, and syntax accuracy).

In some embodiments, the audio locale module 124 may generate one additional text translation at a time, and may check the generated text translation for a match confidence according to one or more embodiments prior to determining whether any additional text translations are required. In some embodiments, the audio locale module 124 may select a next language to check according to one or more rules. For example, the audio locale module 124 may prioritize the most commonly spoken languages globally. In some embodiments, the audio locale module 124 may select a next language based on other metadata of the media content 402. For example, the audio locale module 124 may prioritize the most commonly spoken language associated with the distribution region of the media content 402 (e.g., French may be checked first for a media file distributed in France).

In some embodiments, the audio locale module 124 may use a brute force method whereby some of or all of the available language models are applied against the media content 402 to identify the language that provides the best text translation. For example, German, French, Chinese, Spanish, and Portuguese text translations may be generated for the media content 402. In this manner, the audio locale module 124 may identify or otherwise detect the correct audio locale 416. As illustrated in FIG. 4, the audio locale module 124 may update the media content 402 to update the spoken language 412 with the correct spoken language (here, "French").

Figure 5:
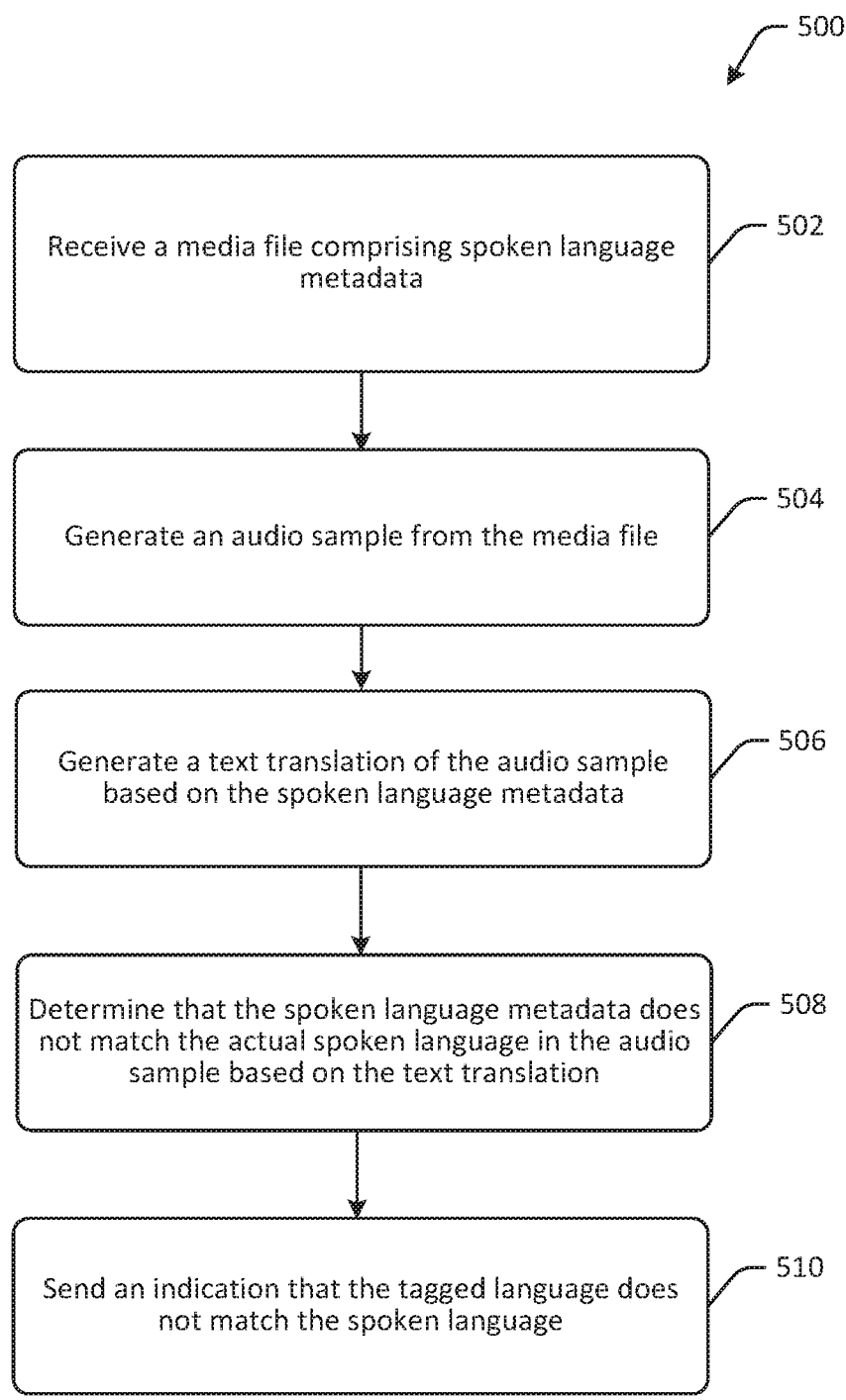
FIG. 5 is a schematic illustration of an example process flow for determining whether the language identified in audio metadata matches the actual spoken language in an audio sample in accordance with one or more example embodiments of the disclosure.

FIG. 5 schematically illustrates an example use case and an example process flow 500 for determining whether the language identified in audio metadata matches the actual spoken language in an audio sample in accordance with one or more example embodiments of the disclosure. Some or all of the blocks of the process flow 500 may be performed in a distributed manner across any number of devices. The operations of the process flow 500 may be optional and may be performed in a different order.

At block 502, a media file comprising spoken language metadata may be received. The spoken language metadata may include a tagged language, such as the spoken language 412 depicted in FIG. 4. The media file may be received according to one or more embodiments, such as by the media receiver module 102 depicted in FIG. 1.

At block 504, an audio sample may be generated from the media file according to one or more embodiments. For example, a 10, 20, or 30-second audio sample can be generated for a two-hour long movie. The audio sample may be preprocessed to generate clean, isolated audio channels. The preprocessing may be completed according to one or more embodiments, such as by the audio preprocessing module 112 depicted in FIG. 1. In some embodiments, preprocessing may include determining an audio sample based on the media content or media content metadata. For example, in some embodiments, subtitle data or other metadata may be analyzed to locate portions of the media content where the most dialog or the most varied dialog will most likely occur. In some embodiments, preprocessing may include filtering the media sample to remove non-dialog audio, such as background noise or music.

At block 506, a text translation of the audio sample may be generated based on the spoken language metadata (e.g., the tagged language). The text translation may be generated according to one or more embodiments, such as by the speech to text conversion module 118 depicted in FIG. 1.

At block 508, a determination is made that the spoken language metadata does not match the actual spoken language in the audio sample based on the text translation. The determination may be made according to one or more embodiments, such as by the audio locale module 124 depicted in FIG. 1. This process may be referred to as an audio matching step. In some embodiments, audio matching may include determining and comparing one or more statistical metrics (e.g., an average confidence, a standard deviation, or a mean squared error of the translation) against a threshold according to one or more embodiments. For example, determining that the tagged language does not match the spoken language may include determining that a confidence metric associated with the text translation does not satisfy a threshold. Conversely, determining that the tagged language does match the spoken language may include determining that a confidence metric associated with the text translation does satisfy a threshold.

As discussed previously herein, audio matching may include determining an actual n-gram frequency of the text translation and comparing the actual n-gram frequency against an expected n-gram frequency based on the language identified in the audio locale metadata. In some embodiments, a first 2-gram (bigram) frequency derived from the text translation is compared against a second 2-gram frequency associated with the expected (tagged) language.

In some embodiments, audio matching may include comparing one or more strings in the text translation against a timed text asset according to one or more embodiments. In some embodiments, audio matching may include parsing the translated text and validating it for correct spelling, grammar, or syntax according to one or more embodiments.

At block 510, an indication may be generated and transmitted indicating that the tagged language does not match the spoken language according to one or more embodiments.

Figure 6:
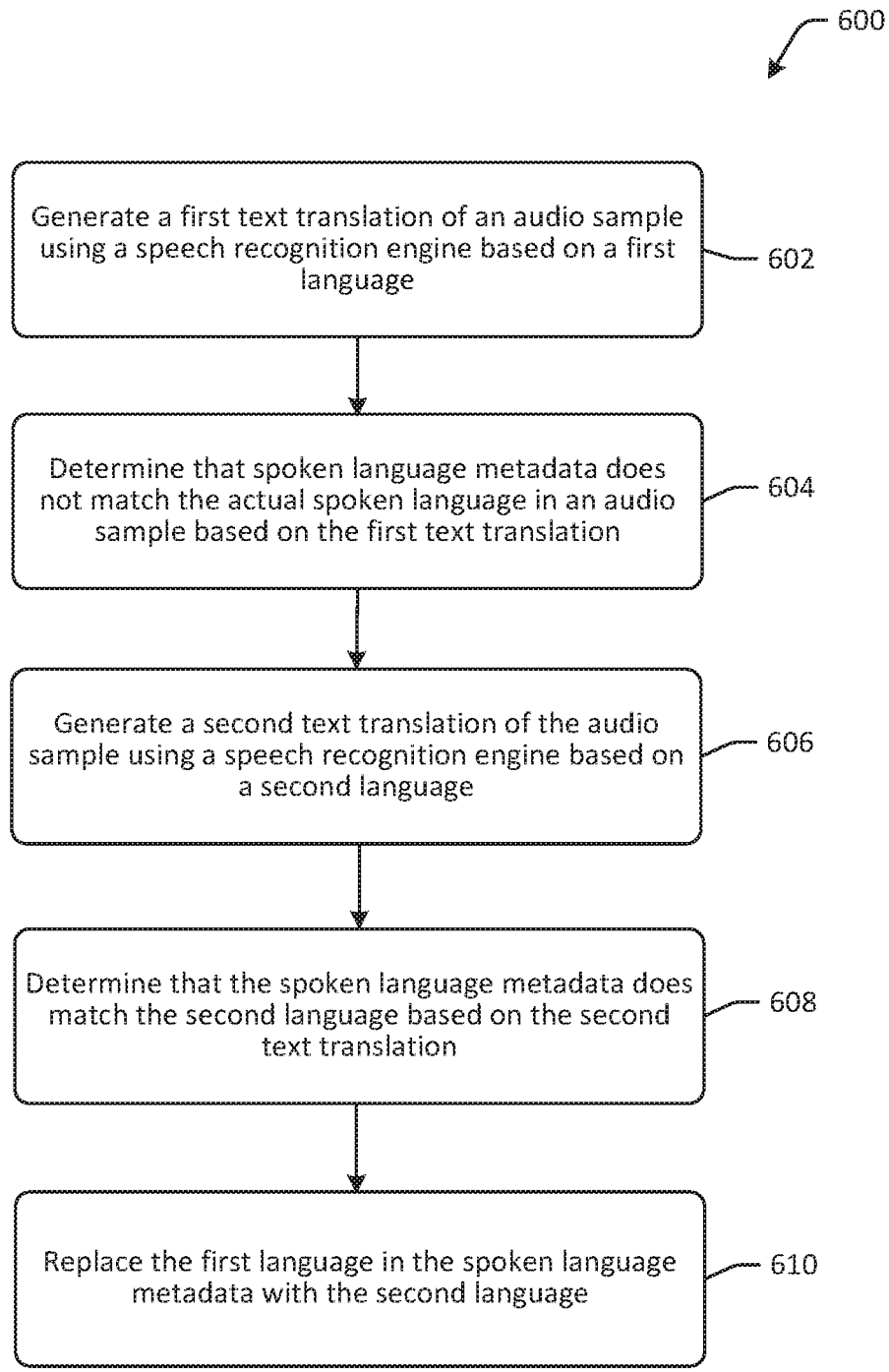
FIG. 6 is a schematic illustration of an example process flow for determining whether the language identified in audio metadata matches the actual spoken language in an audio sample in accordance with one or more example embodiments of the disclosure.

FIG. 6 schematically illustrates an example use case and an example process flow 600 for determining whether the language identified in audio metadata matches the actual spoken language in an audio sample in accordance with one or more example embodiments of the disclosure. Some or all of the blocks of the process flow 600 may be performed in a distributed manner across any number of devices. The operations of the process flow 600 may be optional and may be performed in a different order.

At block 602, a first text translation of an audio sample may be generated based on a first language. In some embodiments, the first language is the language identified as the spoken language in the audio locale metadata (e.g., the tagged language). The text translation may be generated according to one or more embodiments, such as by the speech to text conversion module 118 depicted in FIG. 1. In some embodiments, the audio sample may be generated from a media file according to one or more embodiments. In some embodiments, the audio sample may be preprocessed to generate clean, isolated audio channels. The preprocessing may be completed according to one or more embodiments, such as by the audio preprocessing module 112 depicted in FIG. 1.

At block 604, a determination is made that the spoken language metadata does not match the actual spoken language in the audio sample based on the first text translation. The determination may be made according to one or more embodiments, such as by the audio locale module 124 depicted in FIG. 1. In some embodiments, the determination may include determining and comparing one or more statistical metrics (e.g., an average confidence, a standard deviation, or a mean squared error of the translation) against a threshold according to one or more embodiments. In some embodiments, the determination may include determining an actual n-gram frequency of the text translation and comparing the actual n-gram frequency against an expected n-gram frequency based on the language identified in the audio locale metadata. In some embodiments, the determination may include comparing one or more strings in the text translation against a timed text asset according to one or more embodiments. In some embodiments, the determination may include parsing the translated text and validating it for correct spelling, grammar, or syntax according to one or more embodiments.

At block 606, a second text translation of an audio sample may be generated based on a second language. In some embodiments, the second language is a different language than the one identified as the spoken language in the audio locale metadata (e.g., the first language). The second text translation may be generated according to one or more embodiments, in a similar manner as the first text translation discussed previously herein.

At block 608, a determination is made that the spoken language metadata does match the second language based on the second text translation. The determination may be made according to one or more embodiments, in a similar manner as described previously herein with respect to the first text translation based on the first language. In some embodiments, the determination may include determining that one or more statistical metrics exceed a confidence threshold. In some embodiments, the determination may include determining that an actual n-gram frequency of the second text translation matches an expected n-gram frequency based on the second language. In some embodiments, the determination may include determining that one or more strings in the second text translation match one or more respective strings in a timed text asset according to one or more embodiments. In some embodiments, the determination may include parsing the second text translation and determining that the second text translation satisfies one or more of a spelling check threshold, a grammar threshold, or a syntax threshold according to one or more embodiments.

At block 610, the first language in the spoken language metadata is replaced with the second language according to one or more embodiments. The spoken language metadata may be replaced in a similar manner as the spoken language 412 metadata depicted in FIG. 4.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
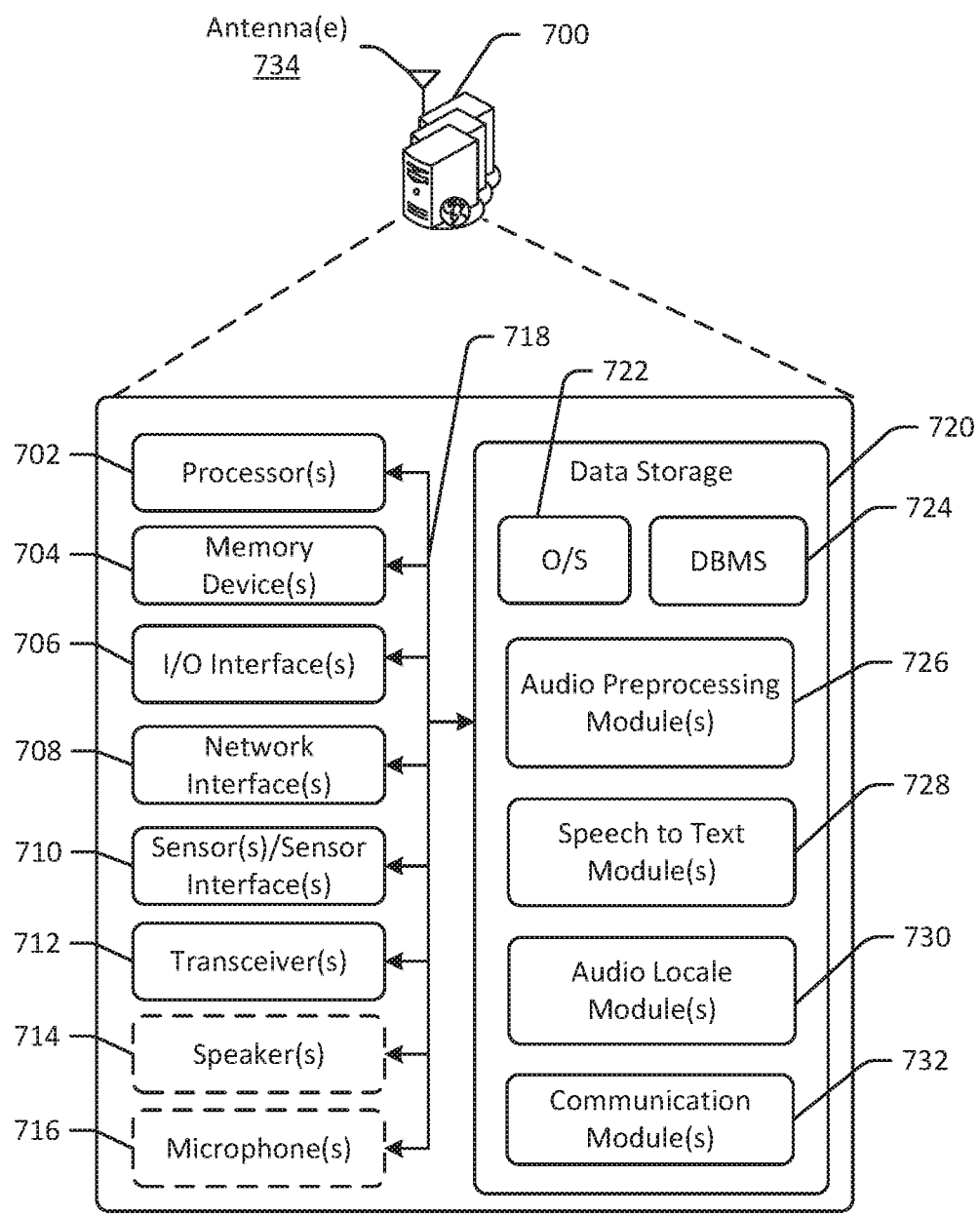
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or generating data including, but not limited to, a remote system (e.g., the audio locale module 124 of FIG. 1) or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform product collection generation, product collection surfacing, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more audio preprocessing module(s) 726, one or more speech to text module(s) 728, one or more audio locale module(s) 730, and one or more communication module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory device(s) 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, threat intelligence data, whitelisted entity data, user account information, user profile information, machine learning models, historical accuracy data, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the audio preprocessing module(s) 726 may include computer-executable instructions, code, or the like that responsive to execution by one or more of the processor(s) 702 may perform functions including, but not limited to, generating one or more audio samples from a raw media content, analyzing subtitle data or other metadata to locate portions of the media content where the most dialog or the most varied dialog will most likely occur, and filtering the media sample to remove non-dialog audio, such as background noise or music.

The speech to text module(s) 728 may include computer-executable instructions, code, or the like that responsive to execution by one or more of the processor(s) 702 may perform functions including, but not limited to, converting the audio sample to text using one or more language models according to one or more embodiments. The speech to text module(s) 728 may generate a text translation for the audio sample based on the audio language identified in the audio metadata and/or one or more additional languages. In some embodiments, the speech to text module(s) 728 may generate a text translation for the audio sample without knowing the actual spoken language associated with the audio sample.

The audio locale module(s) 730 may include computer-executable instructions, code, or the like that responsive to execution by one or more of the processor(s) 702 may perform functions including, but not limited to, determining whether the language used to generate the text translation matches the audio locale metadata, determining and comparing one or more statistical metrics (e.g., an average confidence, a standard deviation, or a mean squared error of the translation) against a threshold, determining an actual n-gram frequency of the text translation and comparing the actual n-gram frequency against an expected n-gram frequency based on the language identified in the audio locale metadata, comparing one or more strings in the text translation against a timed text asset, and/or parsing the translated text and validating it for correct spelling, grammar, or syntax according to one or more embodiments.

The communication module(s) 732 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or alerts, communicating with cache memory data, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna(e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 752.11 family of standards, including via 2.4 GHz channels (e.g., 752.11b, 752.11g, 752.11n), 5 GHz channels (e.g., 752.11n, 752.11ac), or 60 GHz channels (e.g., 752.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 752.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, a media file comprising audio data and spoken language metadata, the spoken language metadata comprising an indication of an English language;
extracting, by the one or more computer processors, an audio sample from the audio data of the media file;
generating, by the one or more computer processors, a first text translation of the audio sample using a speech recognition engine based on the English language;
determining, by the one or more computer processors, that the English language does not match a spoken language of the media file based on the first text translation of the audio sample;
generating, by the one or more computer processors, a second text translation of the audio sample using the speech recognition engine based on a Spanish language;
determining, by the one or more computer processors, that the Spanish language does match the spoken language of the media file based on the second text translation; and
replacing, by the one or more computer processors, the indication of the English language in the spoken language metadata of the media file with a second indication of the Spanish language.

2. The method of claim 1, wherein determining that the English language does not match the spoken language further comprises:
determining, by the one or more computer processors, that a confidence metric associated with the first text translation does not satisfy a threshold.

3. The method of claim 1, wherein determining that the English language does not match the spoken language further comprises:
determining, by the one or more computer processors, an expected bigram frequency based on the English language;
determining, by the one or more computer processors, an actual bigram frequency associated with the first text translation; and
determining, by the one or more computer processors, that the actual bigram frequency does not match the expected bigram frequency.

4. The method of claim 1, wherein determining that the English language does not match the spoken language further comprises:
receiving, by the one or more computer processors, a timed text asset associated with the media file; and
determining, by the one or more computer processors, that the first text translation does not match the timed text asset.

5. A method comprising:
receiving, by one or more computer processors coupled to at least one memory, a media file comprising audio data and spoken language metadata, the spoken language metadata comprising an indication of a first language;
generating, by the one or more computer processors, an audio sample from the audio data of the media file;
generating, by the one or more computer processors, a text translation of the audio sample based on the first language;
determining, by the one or more computer processors, that the first language does not match a spoken language of the media file based on the text translation of the audio sample;
determining, by the one or more computer processors, that a second language matches the spoken language of the media file; and
replacing, by one or more computer processors, the indication of the first language in the spoken language metadata of the media file with a second indication of the second language.

6. The method of claim 5, wherein determining that the second language matches the spoken language of the media file comprises:
generating, by the one or more computer processors, a second text translation of the audio sample based on the second language.

7. The method of claim 5, wherein replacing the indication of the first language in the spoken language metadata with the second indication of the second language comprises:
generating, by the one or more computer processors, a second text translation of the audio sample based on the second language;
determining, by the one or more computer processors, a first confidence metric associated with the text translation based on the first language;

determining, by the one or more computer processors, a second confidence metric associated with the second text translation; and determining, by the one or more computer processors, that the second confidence metric is greater than the first confidence metric.

8. The method of claim 5, wherein determining that the first language does not match the spoken language further comprises:

determining, by the one or more computer processors, a confidence metric associated with the text translation; and determining, by the one or more computer processors, that the confidence metric does not satisfy a threshold.

9. The method of claim 5, wherein determining that the first language does not match the spoken language further comprises:

determining, by the one or more computer processors, an expected n-gram frequency based on the first language;

determining, by the one or more computer processors, an actual n-gram frequency associated with the text translation; and determining, by the one or more computer processors, that the actual n-gram frequency does not match the expected n-gram frequency.

10. The method of claim 9, wherein the expected n-gram frequency comprises a first bigram frequency and the actual n-gram frequency comprises a second bigram frequency.

11. The method of claim 5, wherein determining that the first language does not match the spoken language further comprises:

receiving, by the one or more computer processors, a timed text asset associated with the media file; and determining, by the one or more computer processors, that the text translation does not match the timed text asset.

12. The method of claim 5, wherein determining that the second language matches the spoken language of the media file comprises:

generating, by the one or more computer processors, a second audio sample from the media file; and generating, by the one or more computer processors, a third text translation of the second audio sample based on the second language.

13. A device comprising:

at least one memory that stores computer-executable instructions; and at least one processor configured to access the memory and execute the computer-executable instructions to:

receive a media file comprising audio data and spoken language metadata, the spoken language metadata comprising an indication of a first language;

generate an audio sample from the audio data of the media file;

generate a text translation of the audio sample based on the first language;

determine that the first language does not match a spoken language of the media file based on the text translation of the audio sample;

determine that a second language matches the spoken language of the media file; and replace the indication of the first language in the spoken language metadata of the media file with a second indication of the second language.

14. The device of claim 13, wherein determining that the second language matches the spoken language of the media file comprises:

generating, by the one or more computer processors, a second text translation of the audio sample based on the second language.

15. The device of claim 13, wherein replacing the indication of the first language in the spoken language metadata with the second indication of the second language comprises:

generating, by the one or more computer processors, a second text translation of the audio sample based on the second language;

determining, by the one or more computer processors, a first confidence metric associated with the text translation based on the first language;

determining, by the one or more computer processors, a second confidence metric associated with the second text translation; and determining, by the one or more computer processors, that the second confidence metric is greater than the first confidence metric.

16. The device of claim 13, wherein determining that the first language does not match the spoken language further comprises:

determining, by the one or more computer processors, a confidence metric associated with the text translation; and determining, by the one or more computer processors, that the confidence metric does not satisfy a threshold.

17. The device of claim 16, wherein the confidence metric is an average per word confidence, a standard deviation, or a mean squared error associated with the text translation.

18. The device of claim 13, wherein determining that the first language does not match the spoken language further comprises:

determining, by the one or more computer processors, an expected n-gram frequency based on the first language;

determining, by the one or more computer processors, an actual n-gram frequency associated with the text translation; and determining, by the one or more computer processors, that the actual n-gram frequency does not match the expected n-gram frequency.

19. The device of claim 18, wherein the expected n-gram frequency comprises a first bigram frequency and the actual n-gram frequency comprises a second bigram frequency.

20. The device of claim 13, wherein determining that the first language does not match the spoken language further comprises:

receiving, by the one or more computer processors, a timed text asset associated with the media file; and determining, by the one or more computer processors, that the text translation does not match the timed text asset.

* * * * *